(12) United States Patent
Ho et al.

(10) Patent No.: US 8,001,727 B2
(45) Date of Patent: Aug. 23, 2011

(54) SEALING MOLDING WITH INSERT FOR FORMING CLOSEOUT SURFACE

(75) Inventors: Toan C. Ho, Royal Oak, MI (US); Darrel S. Vassallo, New Haven, MI (US); Haruhisa Kawase, Rochester Hills, MI (US); Mark F. Esper, Royal Oak, MI (US)

(73) Assignee: Magna International Inc, Aurora, Ontario, CA (US)

( * ) Notice: Subject to any disclaimer, the term of this patent is extended or adjusted under 35 U.S.C. 154(b) by 114 days.

(21) Appl. No.: 11/880,834

(22) Filed: Jul. 24, 2007

(65) Prior Publication Data
US 2009/0025300 A1 Jan. 29, 2009

(51) Int. Cl.
*B60J 1/16* (2006.01)
(52) U.S. Cl. ............................................ 49/377; 49/374
(58) Field of Classification Search .................... 49/375, 49/374, 490.1, 495.1, 475.1, 377
See application file for complete search history.

(56) References Cited

U.S. PATENT DOCUMENTS

| | | | | |
|---|---|---|---|---|
| 3,742,649 | A | * 7/1973 | Dochnahl | 49/441 |
| 4,490,942 | A | * 1/1985 | Arnheim et al. | 49/374 |
| 4,696,128 | A | * 9/1987 | Fukuhara | 49/492.1 |
| 5,054,240 | A | 10/1991 | Nakahara et al. | |
| 5,250,241 | A | 10/1993 | Iwasa et al. | |
| 5,353,549 | A | 10/1994 | Henderson et al. | |
| 5,398,451 | A | 3/1995 | Mesnel | |
| 5,438,798 | A | * 8/1995 | Plamper et al. | 49/28 |
| 5,493,814 | A | 2/1996 | Christian | |
| 5,711,907 | A | 1/1998 | Nozaki et al. | |
| 5,740,640 | A | * 4/1998 | Yasuda | 52/204.597 |
| 5,799,442 | A | * 9/1998 | Takahashi et al. | 49/377 |
| 6,007,753 | A | 12/1999 | Nagata | |
| 6,106,911 | A | * 8/2000 | Dupuy | 428/31 |
| 6,141,854 | A | 11/2000 | Mueller et al. | |
| 6,250,018 | B1 | 6/2001 | Kawai et al. | |
| 6,416,113 | B1* | 7/2002 | Page | 296/146.2 |
| 6,938,378 | B2* | 9/2005 | Nozaki et al. | 49/498.1 |
| 7,055,291 | B2* | 6/2006 | Nakanishi et al. | 52/716.5 |
| 7,171,785 | B1* | 2/2007 | Kelly et al. | 49/377 |
| 7,210,730 | B2* | 5/2007 | Fujita et | 296/146.5 |
| 7,407,205 | B2* | 8/2008 | Nakao et al. | 293/128 |
| 7,458,185 | B2* | 12/2008 | Imaizumi et al. | 49/377 |
| 2002/0096912 | A1* | 7/2002 | Page | 296/189 |
| 2007/0278827 | A1* | 12/2007 | Nakao et al. | 296/191 |
| 2007/0278830 | A1* | 12/2007 | Nakao et al. | 296/203.01 |

OTHER PUBLICATIONS

International Search Report and Written Opinion for PCT/CA2008/001323 Dated Nov. 14, 2008.

* cited by examiner

*Primary Examiner* — Jerry Redman
(74) *Attorney, Agent, or Firm* — Miller Canfield (57) ABSTRACT

A weatherstrip assembly is provided for a motor vehicle door frame. The weatherstrip assembly includes a sealing molding having a mounting portion adapted to be attached to the door frame. The weatherstrip assembly also includes an insert having a main body and a head fixedly secured thereto. The head is disposed within the mounting portion of the sealing molding. The insert and the sealing molding define an insert cavity therebetween. A molding substrate is disposed within the insert cavity to bond the insert with the sealing molding and provide a finished appearance at one end of the sealing molding.

10 Claims, 8 Drawing Sheets

SEALING MOLDING WITH INSERT FOR FORMING CLOSEOUT SURFACE

BACKGROUND

This application is directed to weatherstrips for motor vehicles, and to methods for manufacturing weatherstrips for motor vehicles.

BRIEF SUMMARY

According to one aspect of the invention, a weatherstrip assembly is provided for a motor vehicle door frame. The weatherstrip assembly includes a sealing molding having a mounting portion adapted to be attached to the door frame. The weatherstrip assembly also includes an insert having a main body and a head fixedly secured to the main body. The head is disposed within the mounting portion of the sealing molding. The insert and the sealing molding define an insert cavity therebetween. A molding substrate is disposed within the insert cavity to bond the insert with the sealing molding and provide the sealing molding with a finished appearance at one end.

BRIEF DESCRIPTION OF THE DRAWINGS

The embodiments of the invention will be readily appreciated as the same becomes better understood by reference to the following detailed description when considered in connection with the accompanying drawings wherein.

DETAILED DESCRIPTION OF THE EMBODIMENTS

Figure 1:
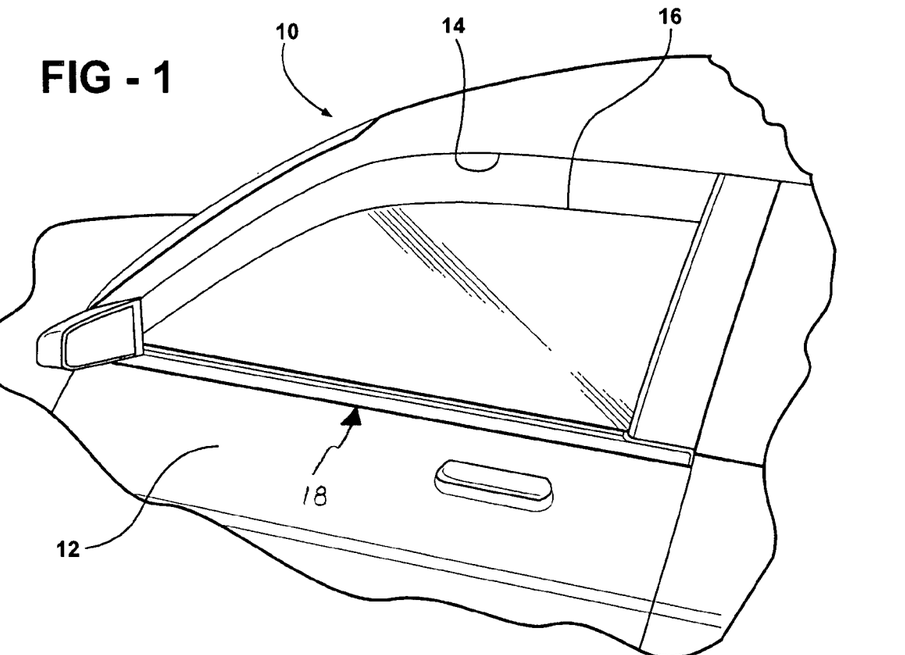
FIG. 1 is a fragmentary perspective view of a motor vehicle.

Referring to FIG. 1, a motor vehicle, generally shown at 10, includes a door 12 defining a window opening 14. The window opening 14 is selectively closed by a window pane 16. A weatherstrip assembly, generally indicated at 18, is attached to a door frame of the door 12 and extends along a portion of the window opening 14. It is appreciated that the weatherstrip assembly 18 may be mounted to any of numerous structures at various locations throughout the motor vehicle 10. In one embodiment, the weatherstrip assembly 18 is an outer belt or belt line molding.

Figure 2:
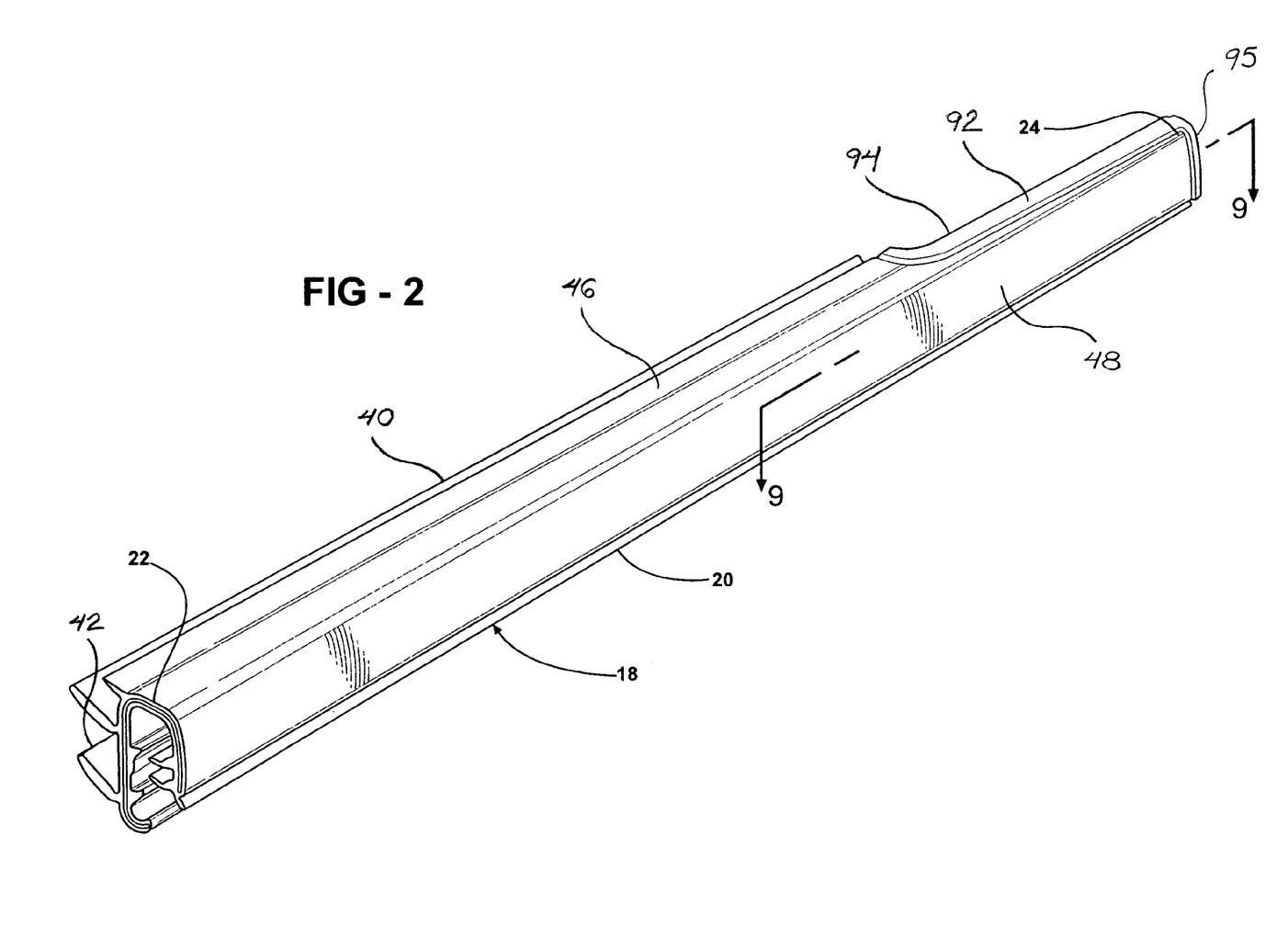
FIG. 2 is a front perspective view of a weatherstrip assembly, including a sealing molding, for attachment to a door frame of a the motor vehicle.
Figure 3:
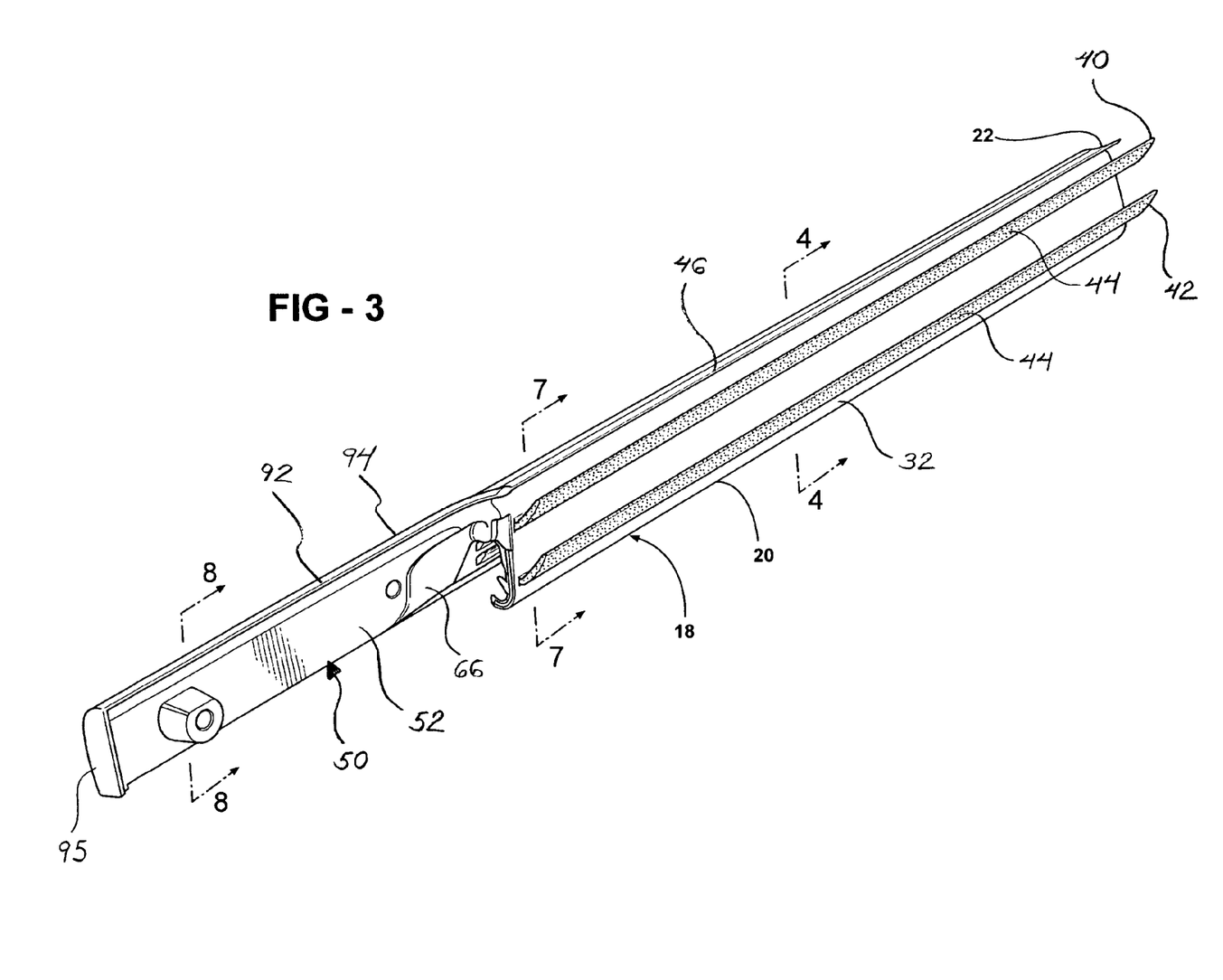
FIG. 3 is a rear perspective view of the weatherstrip assembly.
Figure 4:
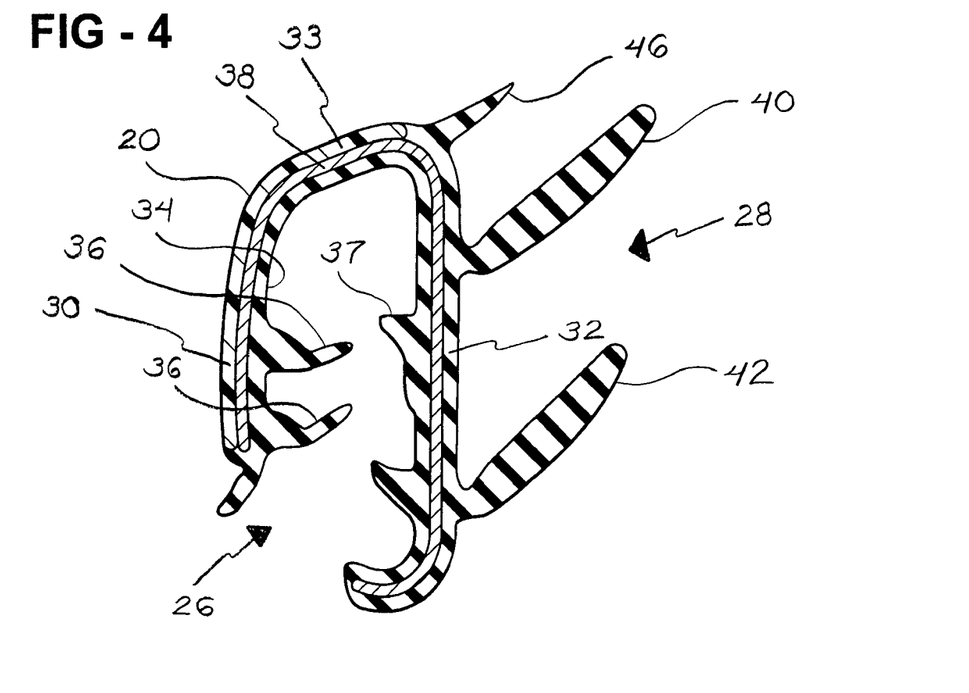
FIG. 4 is a cross-sectional view taken along lines 4-4 in FIG. 3.

Referring to FIGS. 2 and 3, the weatherstrip assembly 18 includes a sealing molding 20. The sealing molding 20 is an elongated member that extends between opposing first 22 and second 24 ends. The sealing molding 20 includes a mounting portion 26 and a sealing portion 28, as shown in FIG. 4. The mounting portion 26 includes spaced apart first 30 and second 32 legs joined together by a web 33. The first leg 30 extends along the entire sealing molding 20 between the first 22 and second 24 ends while the second leg 32 extends along a portion of the sealing molding 20. The first 30 and second 32 legs define a channel 34 therebetween for receiving a flange of the door frame. The mounting portion 26 also includes retention members 36 extending out from the first leg 30 and into the channel 34 to lock the flange in place therewithin. The mounting portion 26 further includes a shelf surface 37 extending out from the second leg 32 and into the channel 34. A carrier 38 is embedded in the mounting portion 26 to provide rigidity to the sealing molding 20. The carrier 38 is typically formed from metal.

The sealing portion 28 includes an upper seal member 40 and a lower seal member 42 each extending out from the second leg 32 in an opposite direction from the channel 34. The upper 40 and lower 42 seal members extend generally between the door frame and the window pane 16 to prevent external elements, such as rainwater, from entering between the door 12 and the window pane 16. The underside of the upper 40 and lower 42 seal members is provided with conventional flock material 44. The sealing portion 28 also includes a sealing flange 46.

The mounting portion 26 and the sealing portion 28 of the sealing molding 20 are extruded together in an in-line extrusion process. Typically, the sealing molding 20 is extruded from a thermoplastic material. After the mounting portion 26 and the sealing portion 28 are extruded, a cover trim member 48 is secured to an outboard surface of the first leg 30 of the mounting portion 26 for aesthetic and protective purposes.

An insert, generally indicated at 50, is fixedly secured to the sealing molding 20, as shown in FIG. 3, to provide rigidity to the second end 24 of the sealing molding 20. The insert 50 is a generally rigid member that may be formed from any of numerous plastic materials.

Figures 5, 6:
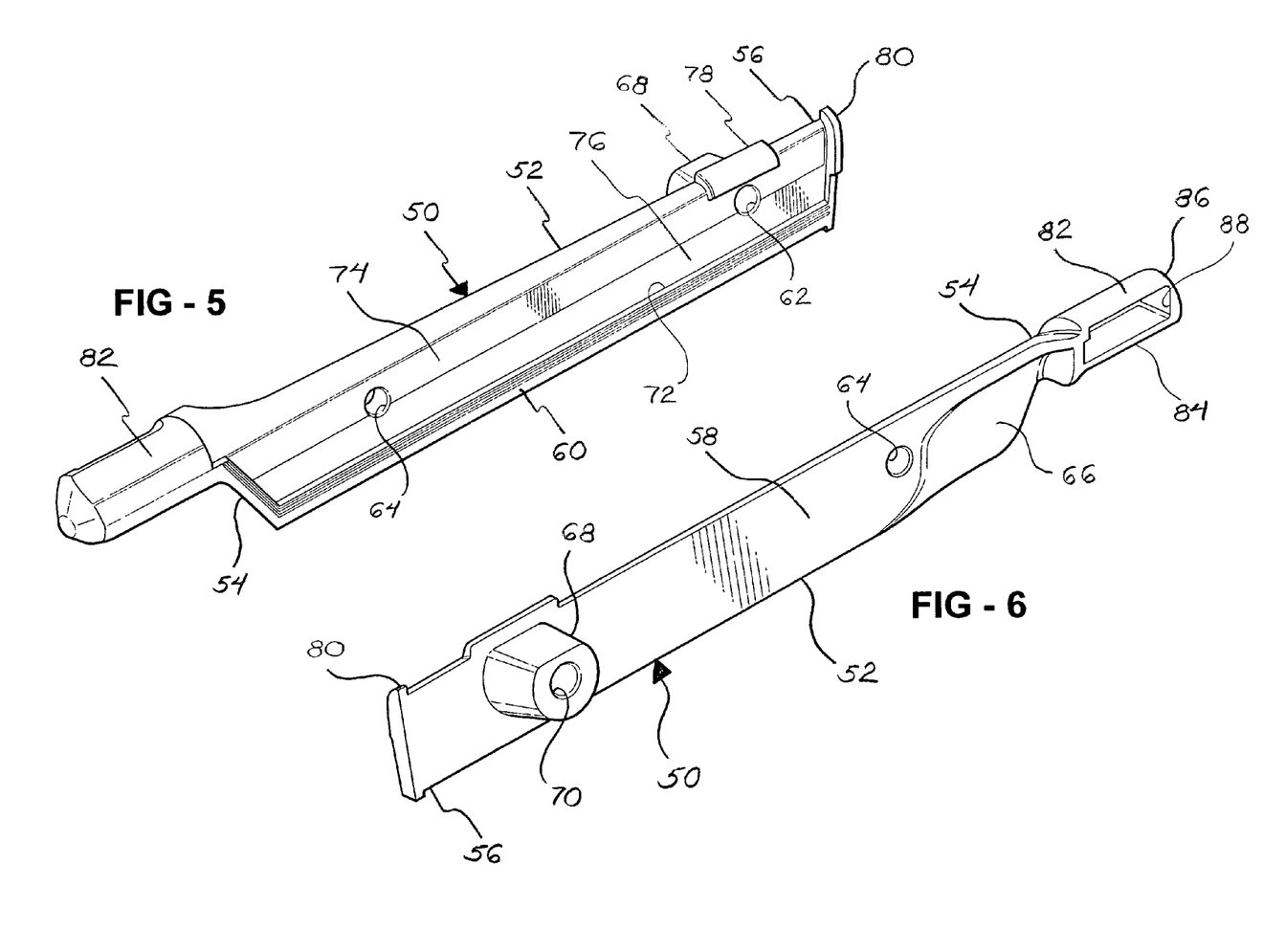
FIG. 5 is a front perspective view of an insert of the weatherstrip assembly.
FIG. 6 is a rear perspective view of the insert.

Referring to FIGS. 5 and 6, the insert 50 includes a main body 52 extending longitudinally between first 54 and second 56 ends. The main body 52 includes opposing inner 58 and outer 60 surfaces and defines spaced apart apertures 62, 64 each extending therethrough. The inner surface 58 includes an indenture 66 adjacent the first end 54 of the main body 52. The inner surface 58 also includes a protrusion 68 extending out therefrom. The protrusion 68 defines a bore 70 that is aligned with the aperture 62.

The outer surface 60 of the main body 52 includes a recessed portion 72. In the current embodiment, the recessed portion 72 extends between the first 54 and second 56 ends of the main body 52. The recessed portion 72 includes an upper section 74 and a lower section 76. The lower section 76 is offset inwardly from the upper section 74. The outer surface 60 further includes a tab 78 disposed above the aperture 62. The main body 52 further includes a lip 80 disposed around the second end 56.

Figure 7:
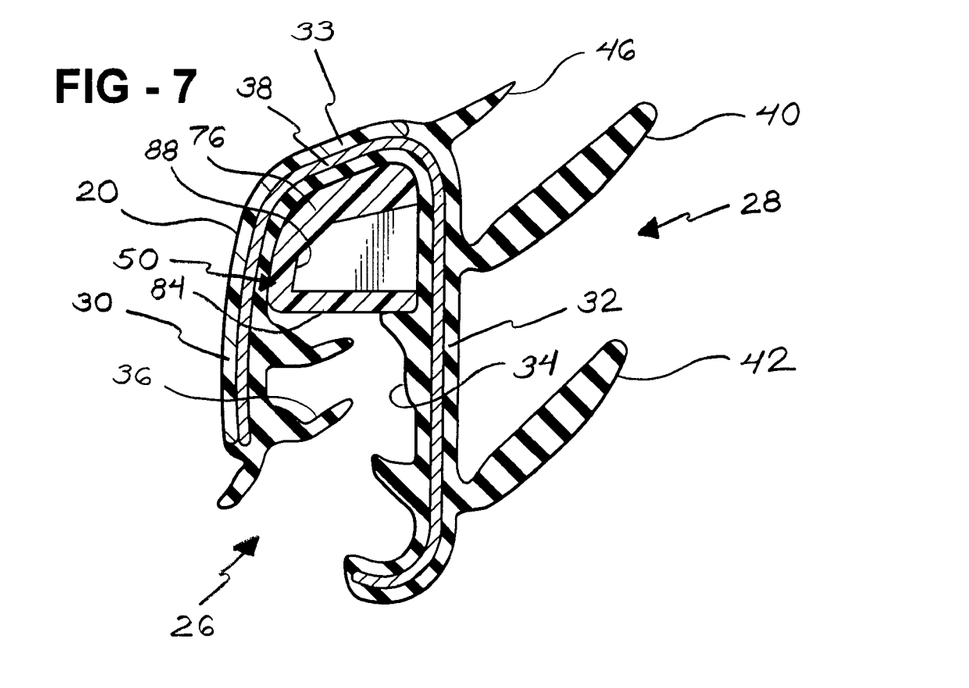
FIG. 7 is a cross-sectional view taken along lines 7-7 in FIG. 3.

The insert 50 includes a head 82 fixedly secured to the first end 54 of the main body 52 and extending out therefrom. The head 82 is shaped to complement at least a portion of the channel 34 of the mounting portion 26 so as to provide a frictional fit when the head 82 is inserted into the channel 34, as shown in FIG. 7. The head 82 includes a bottom surface 84, which may be generally flat, and an outer wall 86 extending out therefrom. The head 82 further includes an opening 88 defined by the bottom surface 84 and the outer wall 86.

Figure 10:
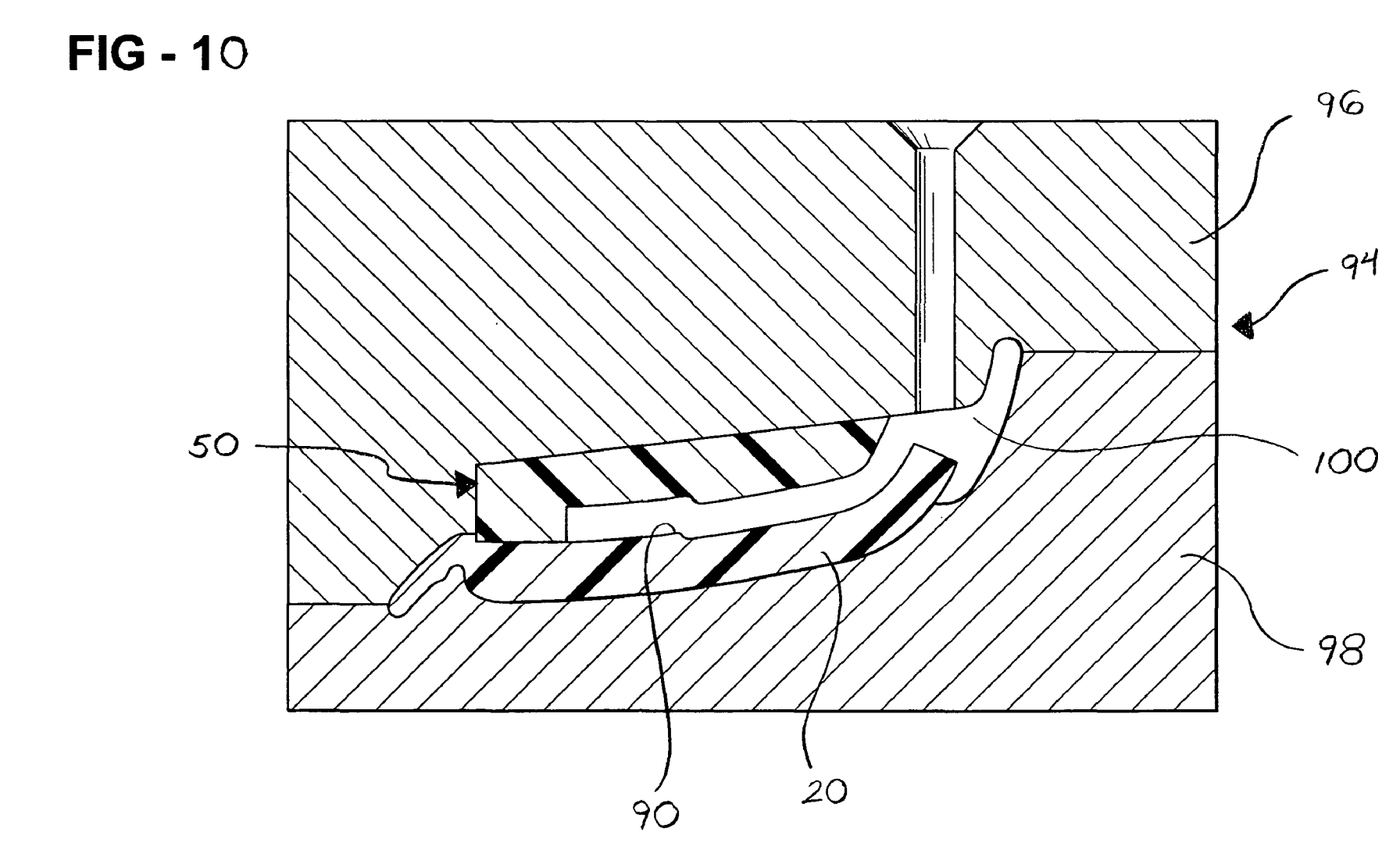
FIG. 10 is a cross-sectional view of a mold assembly, including upper and lower mold plates, with the sealing molding and insert positioned therein and defining an insert cavity.

When the head 82 is fitted inside the channel 34, the insert 50 is secured to the sealing molding 20. And when the insert 50 and sealing molding 20 are secured to one another in such a fashion, the insert 50 and the sealing molding 20 define an insert cavity 90 therebetween, as shown in FIG. 10. It is appreciated that the particular size and shape of the insert cavity 90 may vary.

Figure 8:
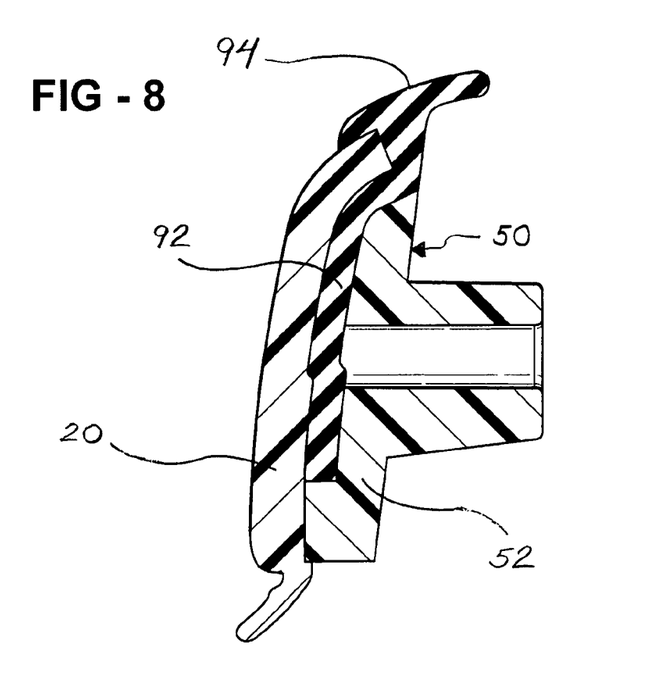
FIG. 8 is a cross-sectional view taken along lines 8-8 in FIG. 3.
Figure 9:
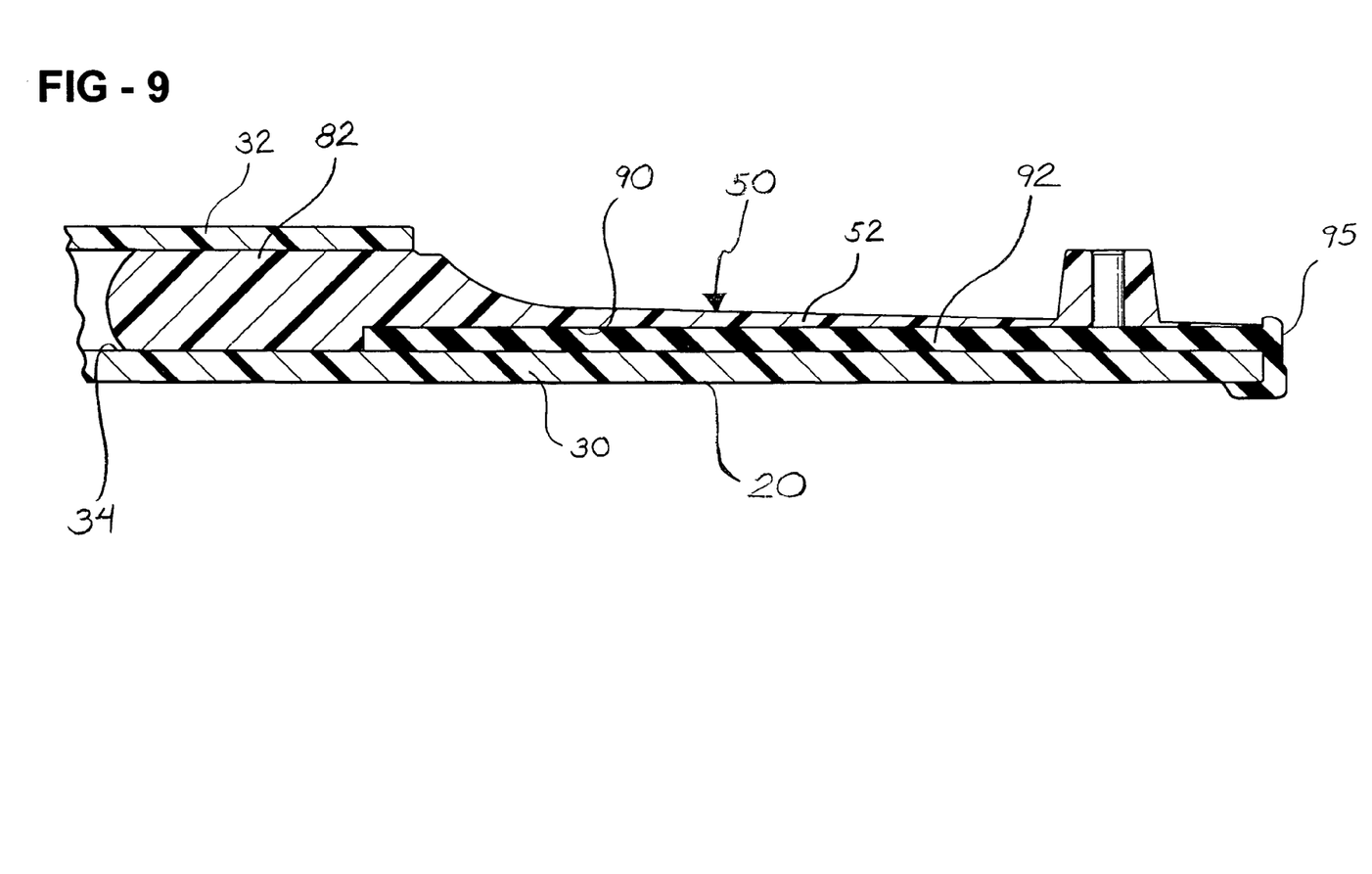
FIG. 9 is a cross-sectional view taken along lines 9-9 in FIG. 2.

Referring to FIGS. 8 and 9, a molding substrate 92 is disposed within the insert cavity 90 formed between the sealing molding 20 and the insert 50. The molding substrate 92 bonds the insert 50 with the sealing molding 20. The molding substrate 92 fills in the recessed portion 72 formed along the outer surface 60 of the insert 50.

In addition, the molding substrate 92 provides a top closeout surface 94 and an end closeout surface 95 to provide the sealing molding 20 with a finished appearance. The top closeout surface 94 abuts against one end of the sealing flange 46 and extends out to the second end 24 of the sealing molding 20. The end closeout surface 95 is formed along the lip 80 at the second end of the main body 52 of the insert 50. It is appreciated that the particular configuration, shape, and dimensions of the molding substrate 92 may vary depending upon the shape of the sealing molding 20, the insert 50, and/or the insert cavity 90 formed therebetween.

Figure 11:
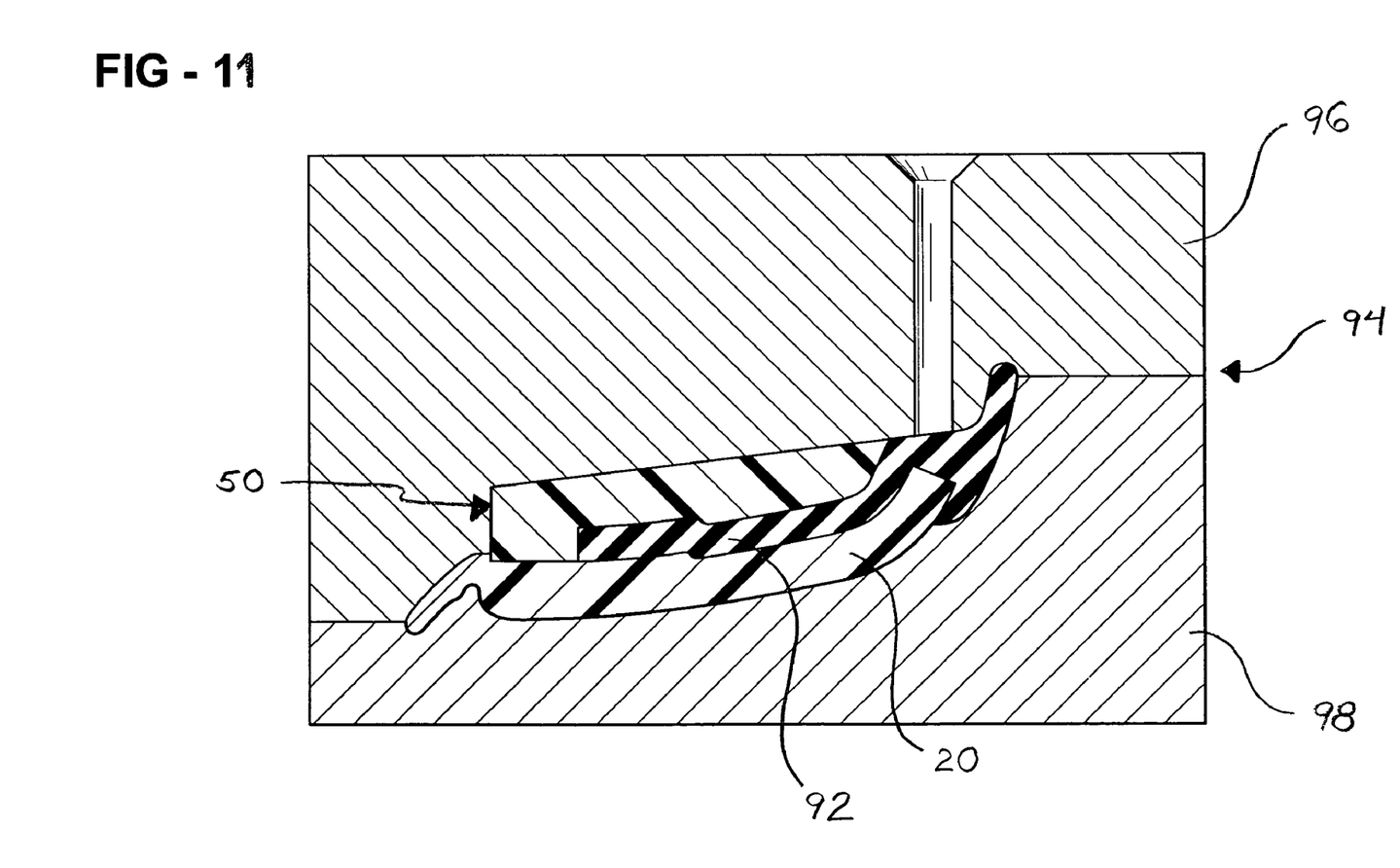
FIG. 11 is a cross-sectional view of the mold assembly including a molding substrate filling the insert cavity.

Referring to FIGS. 10 and 11, a mold assembly, generally shown at 94, is utilized to manufacture the weatherstrip assembly 18. The mold assembly 94 includes a movable plate 96 and a fixed plate 98 defining a mold cavity 100. In the embodiment shown in FIGS. 10 and 11, the movable plate 96 is a top plate and the fixed plate 98 is a bottom plate. The top 96 and bottom 98 plates may be formed from steel.

In a method of manufacturing the weatherstrip assembly 18, a portion of the extruded sealing molding 20, including the mounting portion 26 and the sealing portion 28, is placed along the bottom plate 98 within the mold cavity 100. The head 82 of the insert 50 is inserted into the channel 34 formed in the sealing molding 20. Because the head 82 is shaped to complement the channel 34, the result is a snug fit that at least temporarily secures the insert 50 to the sealing molding 20. At the same time, securing the insert 50 to the sealing molding 20 forms the insert cavity 90 between the insert 50 and the sealing molding 20. The top plate 96 is closed against the bottom plate 98 to clamp the insert 50 in place against the sealing molding 20 in place. At this stage, the mold cavity 100 and the insert cavity 90 are open to one another. Plastic material is injected into the mold cavity 100 and enters the insert cavity 90 between the insert 50 and the sealing molding 20 to form the molding substrate 92. The molding substrate 92 bonds the insert 50 with the sealing molding 20. In addition, the top closeout surface 94 of the molding substrate 92 abuts against one end of the sealing flange 46 and extends out to the second end 24 of the sealing molding 20 while the end closeout surface 95 of the molding substrate 92 is formed along the lip 80 at the second end of the main body 52 of the insert 50. As a result, the weatherstrip assembly 18 has a finished, aesthetically-pleasing appearance.

The attachment of the insert 50 to the sealing molding 20 prior to injection of the plastic material into the mold assembly 94 produces the insert cavity 90 in an area that is normally inaccessible to plastic material due to the configuration of the top 96 and bottom 98 plates. Thus, the insert 50 allows utilization of a conventional mold assembly 94 to manufacture the weatherstrip assembly 18.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A weatherstrip assembly for a motor vehicle door frame including a flange, said weatherstrip assembly comprising:
    a sealing molding having a mounting portion including first and second legs defining a channel adapted for receiving the flange therein;
    an insert including a main body and a head fixedly secured thereto, said head disposed within said channel of said sealing molding, said insert and said first leg of said sealing molding forming an insert cavity therebetween, said insert cavity separate from said channel; and
    a molding substrate disposed within said insert cavity to bond said insert with said sealing molding and provide a finished appearance at one end of said sealing molding.

2. A weatherstrip assembly as set forth in claim 1 wherein said insert includes a recessed portion along a first surface.

3. A weatherstrip assembly as set forth in claim 1 wherein said main body includes a lip formed along an end opposite to said head.

4. A weatherstrip assembly as set forth in claim 1 wherein said mounting portion includes a shelf surface formed along one of said legs and extending into said channel for supporting said head of said insert.

5. A weatherstrip assembly as set forth in claim 4 wherein said head is shaped to complement a portion of said channel.

6. A weatherstrip assembly as set forth in claim 5 wherein said sealing molding includes a sealing portion including a sealing flange.

7. A weatherstrip assembly as set forth in claim 1 wherein one of said first and second legs includes at least one retention member extending into said channel to lock the flange in place therewithin.

8. A belt line molding for attachment to a motor vehicle door frame having a flange, said belt line molding comprising:
    a sealing molding having opposing first and second ends, said sealing molding including first and second legs defining a channel to receive the flange therein, said first leg having a length extending along the entire sealing molding between said first and second ends and said second leg having a length extending along only a portion of said sealing molding such that the length of said first leg is greater than said length of said second leg;
    an insert including a main body and a head fixedly secured thereto, said head disposed within said channel of said sealing molding, said insert and said first leg of said sealing molding forming an insert cavity therebetween, said insert cavity spaced apart from said channel; and
    a molding substrate disposed within said insert cavity to bond said insert with said sealing molding and provide a finished appearance at one end of said sealing molding.

9. A belt line molding as set forth in claim 8 wherein said insert includes a recessed portion along a first surface.

10. A weatherstrip assembly for a motor vehicle door frame including a flange, said weatherstrip assembly comprising:
    a sealing molding having a mounting portion including first and second legs defining a channel adapted for receiving the flange therein, said sealing molding extending between opposing first and second ends wherein one of said first and second legs extends along the entire sealing molding between said first and second ends, and the other of said first and second legs extends along only a portion of said sealing molding;

an insert including a main body and a head fixedly secured thereto, said head disposed within said channel of said sealing molding, said insert and said sealing molding forming an insert cavity therebetween, said insert cavity separate from said channel; and a molding substrate disposed within said insert cavity to bond said insert with said sealing molding and provide a finished appearance at one end of said sealing molding.

* * * * *